US006939504B2

(12) United States Patent
Homann et al.

(10) Patent No.: US 6,939,504 B2
(45) Date of Patent: Sep. 6, 2005

(54) PLASTIC INJECTION MOLDING WITH MOVEABLE INSERT MEMBERS

(75) Inventors: Gregory A. Homann, Canton, MI (US); James Hendry, Brooksville, FL (US); David Turczynski, Highland, MI (US)

(73) Assignee: Lear Corporation, Southfield, MI (US)

( * ) Notice: Subject to any disclaimer, the term of this patent is extended or adjusted under 35 U.S.C. 154(b) by 84 days.

(21) Appl. No.: 10/250,294

(22) Filed: Jun. 20, 2003

(65) Prior Publication Data

US 2004/0188894 A1 Sep. 30, 2004

Related U.S. Application Data

(63) Continuation-in-part of application No. 10/249,237, filed on Mar. 25, 2003.

(51) Int. Cl.⁷ .............................................. B29D 22/00
(52) U.S. Cl. ....................... 264/572; 264/500; 425/130
(58) Field of Search ................................ 264/572, 500; 425/130

(56) References Cited

U.S. PATENT DOCUMENTS

| | | | |
|---|---|---|---|
| 2,331,688 A | 10/1943 | Hobson | |
| 2,345,144 A | 3/1944 | Opavsky | |
| 2,714,747 A | 8/1955 | Lindemann | |
| 2,714,748 A | 8/1955 | Stirnemann | |
| 3,021,559 A | 2/1962 | Strong | |
| 3,044,118 A | 7/1962 | Bernhardt | |
| 3,135,640 A | 6/1964 | Kepka | |
| 3,687,582 A | 8/1972 | Hendry et al. | |
| 3,966,372 A | 6/1976 | Yasuike et al. | |
| 4,033,710 A | 7/1977 | Hanning | |
| 4,078,875 A | 3/1978 | Eckardt | |

(Continued)

FOREIGN PATENT DOCUMENTS

| | | |
|---|---|---|
| CA | 2125623 | 12/1994 |
| DE | 651 725 | 10/1937 |
| DE | 11194127 | 6/1965 |
| DE | 2 106 546 | 8/1972 |
| DE | 2 159 344 | 5/1975 |
| DE | 2651725 | 4/1978 |
| DE | 3444532 | 6/1986 |
| DE | 40 02 503 | 1/1990 |
| DE | 39 13 109 A1 | 10/1990 |
| DE | 40 33 298 | 5/1991 |
| DE | 43 34 012 | 10/1993 |
| DE | 195 31 709 A1 | 3/1997 |
| DE | 10128458 | 2/2003 |
| EP | 0 289 230 | 11/1988 |
| EP | 0 309 182 | 3/1989 |
| EP | 0 309 257 | 3/1989 |
| EP | 0321117 | 6/1989 |
| EP | 0 321 117 | 6/1989 |
| EP | 0 402 730 | 6/1990 |
| EP | 0628395 | 6/1994 |
| EP | 0 950 493 | 10/1999 |
| FR | 1145411 | 10/1957 |
| FR | 2256021 | 7/1975 |
| GB | 1 460 101 | 12/1976 |

(Continued)

Primary Examiner—Suzanne E. McDowell
(74) Attorney, Agent, or Firm—Bill Panagos, Esq.

(57) ABSTRACT

A method and system for producing hollow rib structures for trim components and panels using gas assisted injection molding. Movable insert members are provided in the mold cavity, particularly at the ends of the structural rib members. After the plastic material is injected into the mold cavity, the plastic is packed in the mold, and the insert members are locked in position. Selectively activatable locking mechanisms are used to lock up the insert members. Thereafter, gas or another fluid is introduced into the rib members in order to provide hollow channels therein. Movement of the insert members provides a recess or groove for placement of the displaced resin from the rib members. The displaced resin material completes the formation of the molded plastic article.

27 Claims, 5 Drawing Sheets

U.S. PATENT DOCUMENTS

| | | | |
|---|---|---|---|
| 4,082,226 A | 4/1978 | Appleman et al. | |
| 4,091,057 A | 5/1978 | Weber | |
| 4,092,389 A | 5/1978 | Sakurai | |
| 4,101,617 A | 7/1978 | Friederich | |
| 4,104,353 A | 8/1978 | Monnet | |
| 4,106,887 A | 8/1978 | Yasuike et al. | |
| 4,129,635 A | 12/1978 | Yasuike et al. | |
| 4,136,220 A | 1/1979 | Olabisi | |
| 4,140,672 A | 2/1979 | Kataoka | |
| 4,208,368 A | 6/1980 | Egli | |
| 4,234,642 A | 11/1980 | Olabisi | |
| 4,247,515 A | 1/1981 | Olabisi | |
| 4,255,368 A | 3/1981 | Olabisi | |
| 4,333,608 A | 6/1982 | Hendry | |
| 4,357,296 A | 11/1982 | Hafele | |
| 4,474,717 A | 10/1984 | Hendry | |
| 4,555,225 A | 11/1985 | Hendry | |
| 4,601,870 A | 7/1986 | Sasaki | |
| 4,604,044 A | 8/1986 | Hafele | |
| 4,740,150 A | 4/1988 | Sayer | |
| 4,781,554 A | 11/1988 | Hendry | |
| 5,028,377 A | 7/1991 | Hendry | |
| 5,069,858 A | 12/1991 | Hendry | |
| 5,069,859 A | 12/1991 | Loren | |
| 5,090,886 A | 2/1992 | Jaroschek | |
| 5,098,637 A | 3/1992 | Hendry | |
| 5,204,050 A | 4/1993 | Loren | |
| 5,204,051 A | 4/1993 | Jaroschek | |
| 5,213,713 A * | 5/1993 | Reitz | 252/500 |
| 5,423,667 A | 6/1995 | Jaroschek | |
| 5,607,640 A | 3/1997 | Hendry | |
| 5,759,479 A | 6/1998 | Gotterbauer | |
| 5,849,239 A * | 12/1998 | Harris | 264/408 |
| 5,849,377 A * | 12/1998 | Horikoshi et al. | 428/35.7 |
| 5,885,518 A | 3/1999 | Hendry | |
| 5,928,677 A | 7/1999 | Gosdin | |
| 6,019,918 A | 2/2000 | Guergov | |
| 6,143,237 A * | 11/2000 | Eckardt et al. | 264/572 |
| 6,159,415 A | 12/2000 | Tanada | |
| 6,354,826 B1 | 3/2002 | Thomas | |
| 6,372,177 B1 | 4/2002 | Hildesson et al. | |
| 6,375,892 B2 | 4/2002 | Thomas | |
| 6,576,170 B1 | 6/2003 | Nunnery et al. | |
| 6,579,489 B1 | 6/2003 | Thomas | |
| 6,602,460 B2 | 8/2003 | Thomas et al. | |
| 2003/0011110 A1 | 1/2003 | Pearson | |
| 2003/0011111 A1 | 1/2003 | Pearson | |

FOREIGN PATENT DOCUMENTS

| | | |
|---|---|---|
| GB | 1 487 187 | 9/1977 |
| GB | 2 100 661 | 1/1983 |
| GB | 2 122 130 | 1/1984 |
| GB | 2139548 | 11/1984 |
| GB | 2315050 | 1/1998 |
| JP | 50-74660 | 6/1975 |
| JP | 5714968 | 6/1975 |
| JP | 3009820 | 1/1991 |
| JP | 3-121820 | 5/1991 |
| JP | 4-62118 | 2/1992 |
| JP | 06155501 | 6/1994 |
| JP | 06297522 | 10/1994 |
| JP | 10291227 | 11/1998 |
| JP | 113333876 | 12/1999 |
| WO | WO 96/34731 | 11/1996 |

* cited by examiner

PLASTIC INJECTION MOLDING WITH MOVEABLE INSERT MEMBERS

CROSS REFERENCE TO RELATED APPLICATIONS

This is a continuation-in-part of U.S. patent application Ser. No. 10/249,237 filed on Mar. 25, 2003.

BACKGROUND OF INVENTION

The present invention relates to plastic injection molding and more particularly to plastic injection molding using gas assist and the formation of hollow rib members on plastic injection molded parts.

In the plastic injection molding art, the usual challenges facing the product designer include designing an article having the requisite strength for the product application and satisfactory surface finish, as well as avoiding excessive weight, surface distortions, and increased cycle time. For flat or thin products, it is typical to include one or more rib members in the design to provide relative strength and structure for the molded article. The rib members are typically thicker than the molded article which increases the weight, material usage, and cycle time of the article, and often induces sink marks and other surface defects due to a thermal gradients in the area of the thickened section.

It is known in the plastic molding art to use pressurized gas, such as nitrogen, in conjunction with plastic injection molding of articles. Pressurized gas serves several purposes. The gas allows the article or rib structure to have hollow interior portions which result in savings in weight and material, thereby reducing costs. The pressurized gas also applies an outward pressure to force the plastic against the mold surfaces while the article solidifies. This helps provide a better surface on the molded article and also reduces or eliminates sink marks and other surface defects. The use of pressurized gas also reduces the cycle time as the gas is introduced and/or migrates to the most fluent inner volume of the plastic and replaces the plastic in those areas which would otherwise require an extended cooling cycle. The pressure of the gas pushing the plastic against the mold surfaces further increases the cooling effect of the mold on the part, thus solidifying the part in a faster manner and reducing the overall cycle time.

Where the rib members or other portions of the article in which the gas is being introduced are elongated, it is often difficult to provide a satisfactory molded article. For example, if the pressure of the gas is too great as it enters the mold cavity, there is a risk that it may rupture or blow out the plastic within the mold cavity, i.e. the gas is not contained within the plastic. Also, it is often difficult to have the gas migrate along the full length of an elongated, thicker plastic section, thus creating a product which has an uneven thickness and cooling cycle.

One manner which has been developed in order to overcome some of the above-mentioned problems is shown in U.S. Pat. No. 5,098,637. In that process, a secondary cavity (a/k/a "spillover" cavity) is provided at one end of the molded part or elongated rib member in order to collect and contain the more fluent plastic material which is forced out of the article or rib member by the pressurized gas. Another system is shown in U.S. Pat. No. 5,885,518.

SUMMARY OF INVENTION

An object of the present invention is to provide an improved method of gas assisted injection molding. It is another object of the present invention to provide an improved method and system for injection molding plastic parts with structural rib members.

It is a still further object of the present invention to provide a method and system for gas assist injection molding which eliminates the need for spillover cavities and the subsequent capture and regrinding of excess plastic material from a mold cavity. It is an additional object of the present invention to provide a moveable insert in a mold cavity and allow packing of the plastic material in the mold for better dimensional and surface effects.

In accordance with the objects of the present invention, one or more movable insert members are provided in the mold cavity. The insert members are particularly located in portions of elongated rib members in which pressurized gas is to be introduced in order to provide hollow portions in them. The insert members can be held in place by spring or other biasing members or mechanisms which are adapted to be overcome by the force of the plastic and pressurized gas when the gas is introduced into the rib members.

A full-shot of plastic material is first injected into the mold cavity. The plastic material is then packed in the mold by additional pressure plastic injection from the molding machine. Thereafter, pressurized gas is introduced into at least one of the rib members. As the gas channel is formed in the rib member(s) and the fluent plastic material in the center of the rib member(s) is pushed along the rib member (s) and out the opposite end(s), the spring or biasing force on the insert member(s) in one embodiment of the invention is overcome. As the insert member(s) retracts, the plastic material fills the entire article defining mold cavity. The displaced plastic material flows into the area formerly occupied by the insert member(s), creating an additional rib or part of the molded article.

Once the entire article is formed, the plastic is allowed to cool and solidify. The injected gas pressure is then relieved (vented or exhausted) from the formed article and the article is ejected or removed from the mold.

In one preferred embodiment, the insert member is held in its initial position by spring tension, pressurized cylinders, damping mechanisms, or the like. These tensioning or biasing mechanisms provide a sufficient biasing force to resist the level of force caused by pressure in the mold from the initial injection of the plastic material. This maintains the nominal wall thickness of the article being molded throughout the full extent of the mold with the exception of the thicker section of the rib members. Once the cavity is full, pressurized gas is introduced at the end of the rib members opposite the insert members. The force of the gas pressure and the resin forced from the rib members overcomes the biasing force of the insert members.

In order to withstand the additional packing pressure applied to the plastic material in the mold, the insert members are fixed or locked into position by use of a releasable locking mechanism. The locking mechanism can be a pneumatic, hydraulic, or electrical mechanism, or can utilize a controllable fluid which can be solidified by application of an electric current. The insert member can then be released for movement when the gas is injected by the use of various devices, such as position sensors, cavity pressure sensors, timers, or the like, or the deactivation of the electric current. The release or deactivation of the locking mechanism can be based or triggered in a number of different ways, such as by attainment of certain pressures in the mold, process timing sequences, linear movement of the injection screw, etc.

The above objects and other objects, features, and advantages of the present invention are readily apparent from the following detailed description of the preferred embodiments for carrying out the invention when taken in accordance with accompanying drawings.

DETAILED DESCRIPTION

The present invention is particularly suitable for producing hollow rib structures for structural reinforcement of decorative or non-decorative trim components and panels using gas-assist plastic injection molding.

Figure 1:
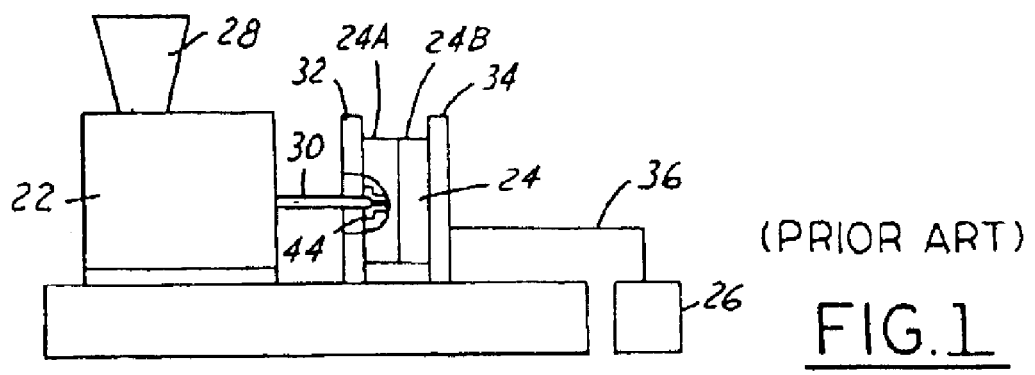
FIG. 1 is a schematic diagram of a typical plastic injection molding system.

As shown in FIG. 1, a conventional plastic injection molding system 20 is shown. The system 20 includes an injection molding machine 22, a mold 24, and a source of gas 26 for the gas assisted injection molding. As is well known in the injection molding field, injection molding machine 22 has a hopper 28 in which plastic pellets are added to the machine. The injection molding machine includes a mechanism for melting the plastic material and a screw-type ram (not shown) in the body of the machine. The molten plastic material is injected through a nozzle 30 into the mold 24.

Mold 24 includes two mold halves 24A and 24B. The two mold halves are connected to platens 32 and 34 which separate and come together as one or more is moved on the injection molding machine.

The gas used in injection molding is typically an inert gas, such as nitrogen, and is supplied from a storage canister or system (not shown) to a gas injection controller 26. The controller 26 regulates the flow of gas through a conduit 36 or the like into the mold 24.

Figure 2:
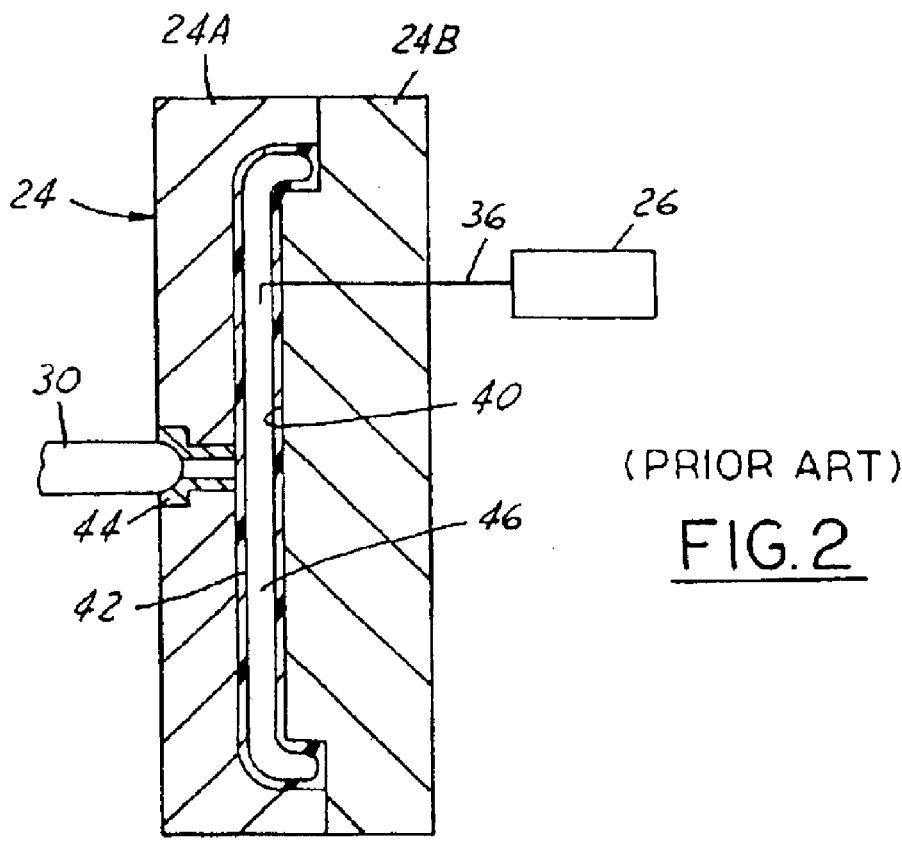
FIG. 2 is a schematic diagram of an article being molded in a conventional gas assisted plastic injection molded system.

It is to be understood that the present invention can be used with any plastic injection molding machine 22, any gas assist controller 26, and virtually any type of mold 24. In this regard, a schematic drawing of a representative mold 24 is shown in FIG. 2.

An article forming cavity 40 is provided between the two mold halves 24A and 24B. The plastic material 42 is injected through the machine nozzle 30, and through a bushing 44 into the mold cavity 40. After all or a substantial portion of the plastic material 42 is injected into the mold cavity 40, gas from the controller 26 is introduced into the mold cavity. The gas forces the plastic material into all portions and into all surfaces of the mold cavity 40 and provides a hollow interior 46.

Once the plastic material 42 has cooled and solidified in the mold, the gas is vented, and the mold is then opened in order to allow the part to be removed. In this regard, there are many mechanism systems known for relieving the gas pressure in the mold, i.e. venting or exhausting the gas from the mold, and any conventional system and method can be utilized. For example, gas can be vented back through the conduit 36 to the controller, or the nozzle 30 can be backed off from the bushing 44 creating a "sprue break." Also, plastic formed articles are typically assisted in being removed from the mold by one or more ejector pins (not shown).

Figure 3:
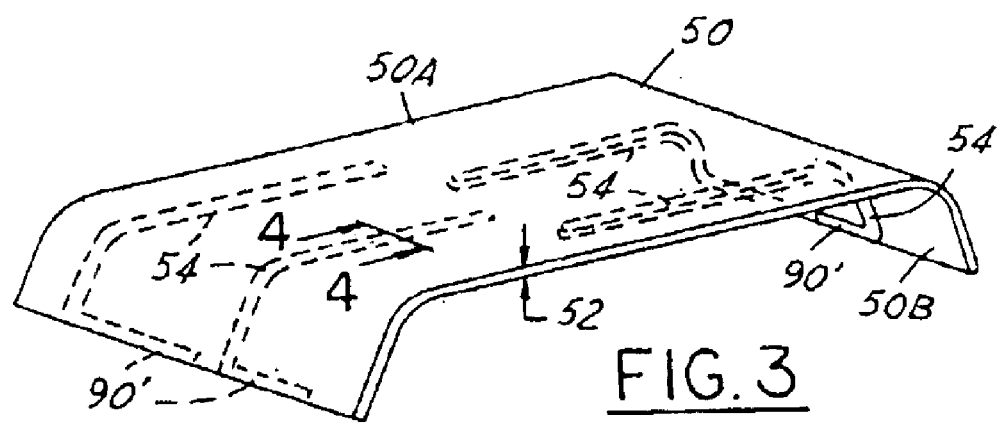
FIG. 3 is a perspective view of a molded part or article according to the present invention.

As indicated, the present invention is particularly suitable for producing plastic injection molded trim components and panels having rib members. A representative article of this type is shown in FIG. 3 and identified generally by the reference numeral 50. As shown, the article 50 has a relatively thin thickness 52 relative to its width and length and has a plurality of rib members 54 on one surface (typically the back or non-visible surface). The outer surface 50A of the article 50 is the surface which is exposed to view when the part is used or installed in its appropriate environment. The article 50 could be, for example, a computer housing, a panel for a door or other article of a vehicle, or the like. Rib members 54 are provided on the opposite side 50B and are hidden from view during normal use of the article 50. Although four rib members 54 are shown on the article 50, any number of rib members may be utilized. The rib members in particular provide structural support for the panel-type article 50.

Since the rib members 54 are typically thicker in dimension than the width or thickness of the article 50, gas assist injection molding techniques and procedures are typically utilized in order to hollow out the rib members. This reduces the thickness of the rib members, thereby saving material cost, reducing cycle times, and minimizing or eliminating surface defects, such as sink marks, on the viewed surface 50A.

The term "gas" used herein means any gas body gaseous during normal temperature and pressure, such as nitrogen, carbon dioxide air. Preferably, the gas is an inert material, such as nitrogen or carbon dioxide. The gas can be provided from any conventional source, such as a storage tank, bottled gas, or the like. It is also possible in accordance with the present invention to utilize another fluid, such as water, in place of the gas. These other fluid systems are known in the art and do not need to be discussed in more detail here.

Figure 4:
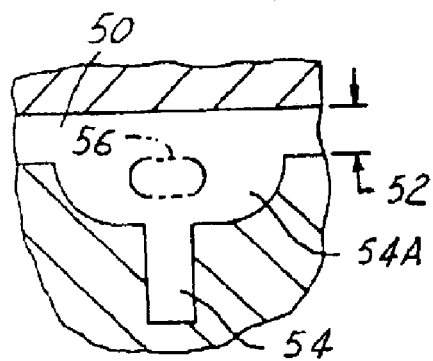
FIG. 4 is a cross-section of a structural rib member on a part made in accordance with the present invention, the cross-section being taken along lines 4—4 in FIG. 3 and in the direction of the arrows.

A rib member 54 is shown in cross-section in FIG. 4. The article 50 has a certain thickness 52 which requires a certain cooling and cycle time. In order to provide requisite structural support, the rib member 54 typically has thicker portions, such as 54A. In order to lighten the of the rib member 54 and reduce its thickness, a channel 56 is provided in the rib member by the introduction of the pressurized gas or other fluid.

Although the injection molding system is shown utilizing a single bushing member 44 positioned between the nozzle 30 of the injection molding machine 22 and the mold 24, it is understood that any conventional injection molding system could be utilized in transporting the molten plastic material from the nozzle 30 to the mold cavity 40. For example, a hot runner system with one or more manifolds and a plurality of bushings could be utilized. Other systems and mechanisms known in the art could also be utilized.

Figure 6:
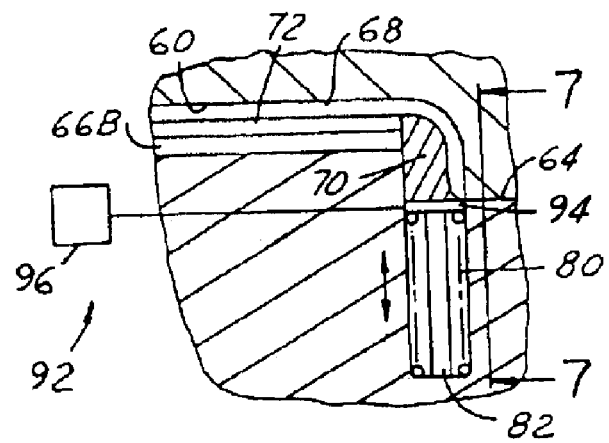
FIG. 6 is a partial cross-sectional view showing an insert member in accordance with the present invention.
Figure 5:
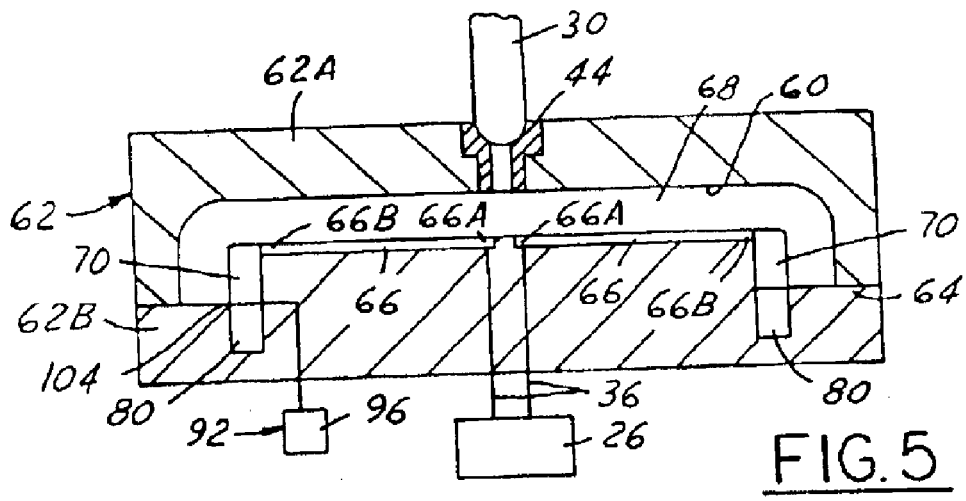
FIG. 5 is a cross-sectional view of a mold utilizing an embodiment of the present invention.
Figure 7:
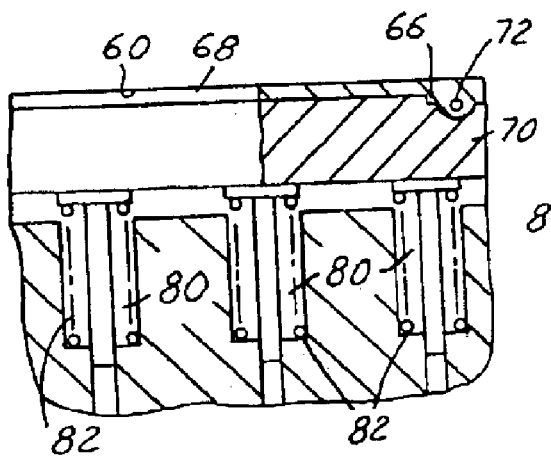
FIG. 7 is another view of an insert member in accordance with the present invention, the view being taken in the direction of the arrows 7—7 in FIG. 6.
Figure 8:
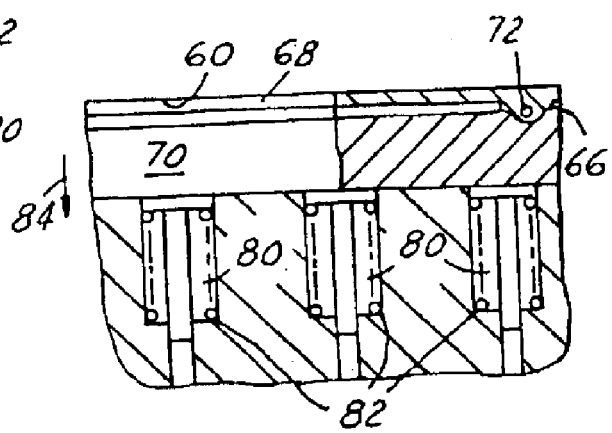
FIG. 8 is another view of the insert member and mechanism as shown in FIG. 7, with the insert member being displaced in response to the introduction of gas in a rib member.

A representative molding system in which the present invention is utilized is shown in FIG. 5. Further details of this embodiment are shown in FIGS. 6–8. The basic steps in this embodiment of the invention are set forth in FIG. 9.

The present invention can be used with all types of plastic materials, particularly thermoplastic materials, which generally may be injection molded. These materials can be, for example, low or high density polyethylene, polyurethane, polypropylene, polystyrene, acrylonitrile butadiene styrene (ABS) resin, SAN resin, polyvinyl chloride, polymethyl methacrylate, and the like. Materials such as polycarbonate, polyester, acetyl, polyacetyl and nylon also may be used, as well as ethylene copolymers such as ethylene-vinyl acetate copolymer, ethylene-ethyl acrylate copolymer, and the like. Furthermore, any of these resins may contain fillers, such as glass fiber, powdered glass, calcium carbonate, calcium sulfate, talc, mica, and the like.

In accordance with the present invention, molten plastic material is injected from a machine nozzle 30 to a bushing 44 and into a mold cavity 60 in a mold 62. The two mold halves 62A and 62B are adapted to separate along part line 64 in order to allow the formed plastic article to be removed. A gas regulated by gas controller 26 is introduced through conduits 36 into ends 66A of rib members 66 on the plastic article 68, which is formed in the mold cavity 60. Movable or displaceable insert members 70 are provided in the mold cavity 60, and are positioned such that they are situated at the opposite ends 66B of the rib members 66. Pressurized gas is introduced into the rib members 66 and forms channels 72 essentially through the centers of the cross-sections and throughout their lengths.

Prior to injection of the gas, the plastic material in the mold is packed the introduction of more plastic material, and at a higher pressure. This insures excellent surface quality for the molded article or product. Also, once the plastic packing is completed, a shut off valve (not shown) in the nozzle closes off the plastic supply prior to the injection of the gas. This prevents plastic material from being forced or pushed back into the barrel of the injection molding machine.

The gas is injected into the resin in the mold at a pressure higher than the plastic injection pressure and typically at a much higher pressure. For example, the initial plastic injection fill pressure could be 100–200 psi, which will normally increase to 500–1000 psi or higher with packing pressure. The gas injection could be 1000–1500 psi (if, for example, the plastic material was polypropylene) and 3000–7000 psi (if, for example, engineering grade resins were used). In general, the pressure of the gas should be sufficient to provide a commercially acceptable surface and finish on the plastic part. When the plastic is packed in the mold cavity, the pressure is raised several times over the initial injection pressure and additional plastic material is packed into the mold cavity. The pressure of the gas is typically higher than the plastic packing pressure.

The insert members 70 are held in position in the mold cavity by a biasing or tensioning mechanism 80. In this regard, as shown in FIGS. 7 and 8, the insert member 70 is typically elongated in shape and thus a number of biasing mechanisms 80 are provided along its length. A biasing force is provided by the biasing mechanism 80 such as by one or more coil spring members 82 as shown in FIGS. 6–8. The spring members 82 provide a biasing force against the insert member 70 sufficient to oppose the force of the plastic material 68 when it is injected into the mold cavity 60. The biasing force or spring tension holding the insert member in place preferably should be sufficient to resist a force of 150–200 psi (10.4–13.8 bars).

It is to be understood that any type of biasing, tension, or force-type member or mechanism can be used to hold the insert members in place. For example, gas or air charge cylinders can be utilized in place of the coil spring members 82, or a conventional dampening mechanism could be utilized. The biasing member has to provide a sufficient force or load on the insert member to resist the level of force caused by pressure in the mold cavity during the injection of the plastic material. This maintains the nominal wall thickness of the article 68 to the end of the flow length with the exception of the thicker section of the rib member 66.

As shown in FIGS. 7 and 8, the introduction of pressurized gas through the rib member 66 forms channel 72 in the rib member and forces plastic material against the insert member forcing it to move downwardly in the direction of the arrow 84 in FIG. 8. The additional space formed in the mold cavity by the movement of the insert member is filled with molten plastic forced from the rib member. The additional plastic forms an additional rib member 90 adjacent the end of the now hollow rib member 66. Additional rib members of this type are shown in FIG. 3 and identified by the reference numeral 90'. The additional rib members 90' are positioned at the end of the rib members 54 and can provide additional support and structural stability to the article 50. Depending on the amount of displaced plastic material and the gas injection pressure, it is also possible to provide a gas channel and thus a hollow structure through a portion of the new rib member 90.

Although the invention is primarily directed to the formation of structural rib members on plastic injection molded articles, such as trim components and panels, it is also possible to use the present invention to produce or provide portions of articles necessary to allow appropriate molding. For example, it is often necessary to provide molded portions of an article in order to prevent undercuts and the like and thus to assist in the production of molds which can be opened and closed more easily and allow the parts to be removed and ejected.

The thickness of the additional rib member 90 preferably should not be greater than the maximum thickness of any other part of the molded article (for minimum cycle times). Also, depending on the strength of the rib members 90 needed for the particular application and molded part, the rib members can be increased in width. In order to insure that size and thickness of the added portion or rib member 90 remain within predetermined limits, a stop member (not shown) can be utilized to limit the travel of the insert member 70.

Although the portion formed on the molded article by the displacement of the insert member is referred to herein as a rib member, it is to be understood that the portion can have the shape and size to add virtually any structure to the article, such as, for example, a boss, a snap fit member, etc. The portion can also be used to add additional strength to the article.

The size, shape and volume of the insert member and resultant added portion formed on the article should be predetermined, so that all ejected plastic material from the rib member can be accommodated. Similarly, the size of the added portion should be sufficient to accommodate for volumetric differences in the plastic material from the shot-to-shot (i.e. from cycle to cycle). The biasing mechanism 80 allows for such volumetric differences.

As an alternate embodiment, it is also possible to introduce the gas into the rib member 66 at a location inbetween the ends 66A and 66B. In such an embodiment, it is also possible to position insert members and form additional article portions at both ends of a rib member.

Figure 9:
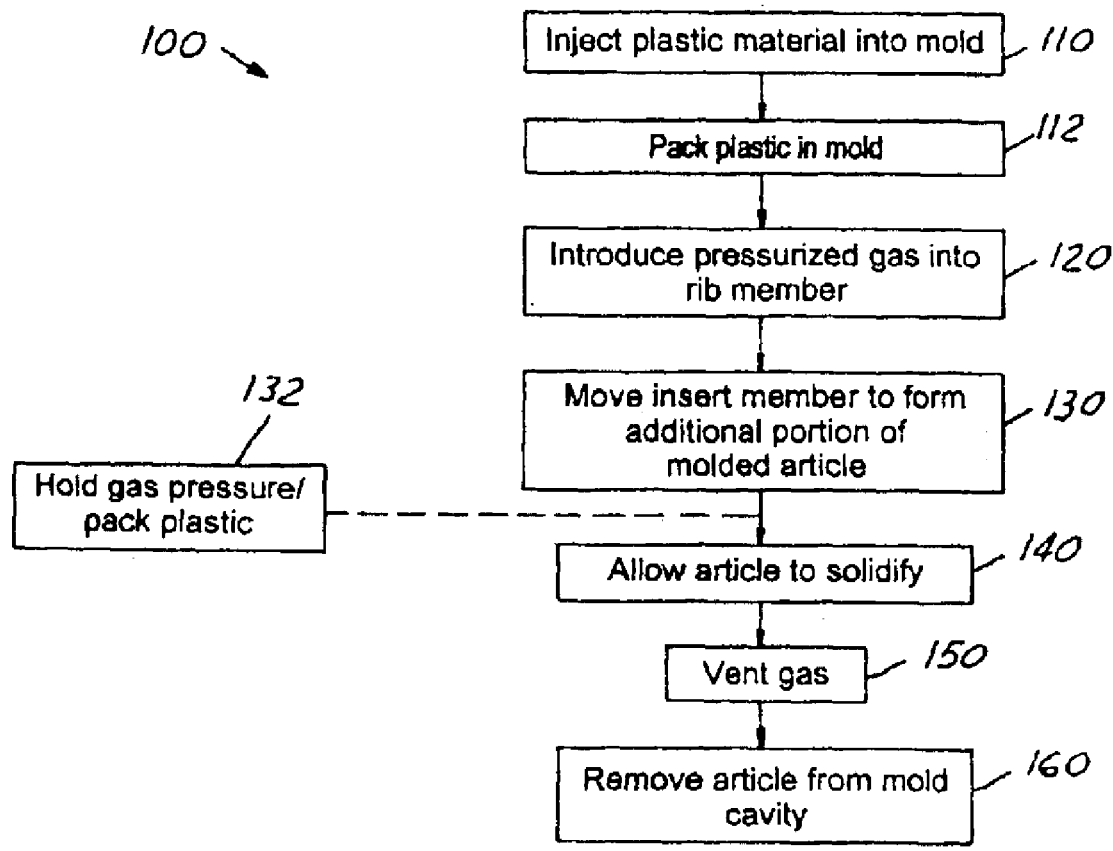
FIG. 9 is a flow diagram indicating the basic steps involved in the practice of the method of the present invention.

The basic steps in the process in accordance with the present invention are set forth in the flow diagram in FIG. 9. The basic method is referred to generally by reference numeral 100. As a first step, the plastic material is injected into the mold cavity in the mold. This is referred to by the reference numeral 110 in FIG. 9. This first step is completed after the precise mold cavity size and shape is selected, the mold cavity is machined in the mold, the appropriate hot runner system, bushing, and manifold mechanism is selected and provided, the requisite size of the injection molding machine is selected, the type of plastic or resin material for the article or part is selected and provided, and the appropriate processing parameters, such as time, pressures, temperatures, and cycle time, are determined. All of these matters are within the ordinary skill in the art.

The molten plastic resin material is injected into the mold cavity by the injection molding machine until the article cavity is full of plastic material. In this manner, a "full shot" of plastic material is injected into the mold cavity. In order to provide better aesthetics on the final and insure that all of the dimensions and surface details are obtained, the injected plastic material is then packed in the mold. The pressure of the plastic injection is increased and additional plastic material is forced into the mold cavity. This pressure can be held for a certain length of time, such as 5–15 seconds, in order to form a solidified outer shell on the product. This is shown in Box 112 in FIG. 9.

Figure 10:
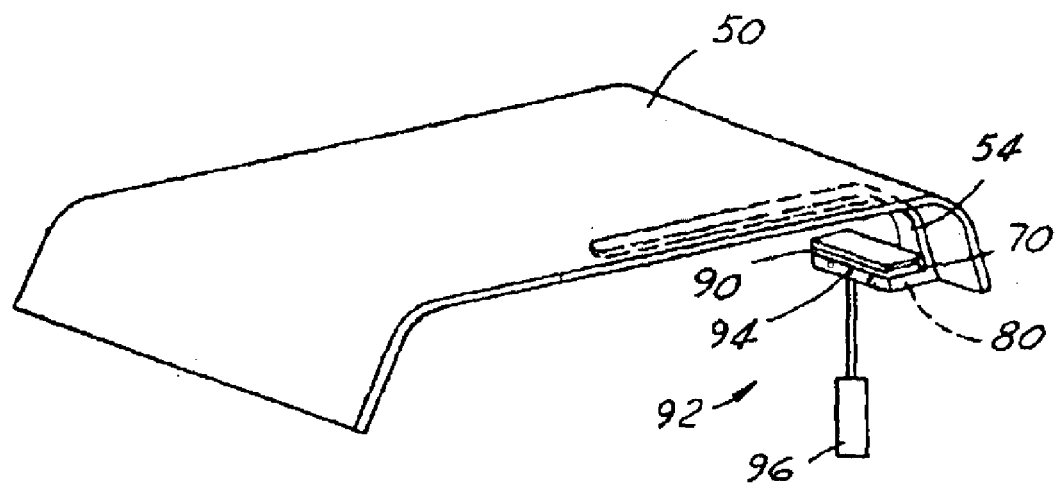
FIG. 10 is a schematic diagram depicting a locking mechanism for an insert member.

In this regard, in order to prevent the insert member from being dislodged or moving during the additional pressure or packing procedure, the insert members are held or locked into position by the use of an external locking mechanism 92 which can be a wedge, pin, or the like 94 (see FIGS. 5–6 and 10). The wedge 94 is situated in the mold to be moved into position preventing movement of the insert member 70. The wedge 94 is activated by a activation system 96, such as a pneumatic, hydraulic, electric, or mechanical mechanism or system and set and locked into position or released by the use of various devices, such as position sensors, cavity pressure sensors, timers, and the like (not shown).

After the mold cavity is full of packed molten plastic resin material, the gas is injected into one or more of the rib members. This is shown by Box 120 in FIG. 9. The gas is preferably injected at one end of the rib members opposite the insert members and at a predetermined time and pressure. The pressure of the gas is typically higher than the pressure used to pack the plastic in the mold.

In order to prevent any of the plastic material from being forced back into the nozzle or injection molding machine during gas injection, a shut-off valve should be provided at, or adjacent to, the nozzle and closed upon the completion of the packing procedure.

During the gas injection procedure, the molten plastic material is displaced from the core or interior of the rib members creating an increase in pressure on the insert member or members. This pressure overcomes the biasing force caused by the spring mechanisms or the like, forcing the insert members away from their rest positions and retracting to increase the available volume of the cavity. This is shown in Box 130 in FIG. 9. The displaced plastic material from the rib members will flow into the voids formed by the displacement of the insert members. The range of movement of the insert member is preferably predetermined in order to provide an additional part or portion on the article of a certain size, shape, and length. At the end of movement of the insert member, the pressures equalize on the insert member, allowing the external gas pressure to provide packing pressure to the molded part throughout the rib members.

If desired, once the insert members are displaced and the voids are filled with the plastic material, an additional packing procedure can be provided by the introduction of a higher pressurized gas. This is shown as an alternative in Box 132 in FIG. 9.

Once the mold cavity is filled with plastic material and the gas assist process is completed, the plastic article is allowed to cool and solidify in the mold. This is shown in Box 140 in FIG. 9. Thereafter, the gas is vented or exhausted from the rib members as shown in Box 150. The venting of the gas from the rib members can be accomplished in any standard manner known to persons of ordinary skill in the art. For example, one method allows the gas to vent back through the end of the rib members where the gas is initially introduced. The gas pressure can also be relieved in a stepped manner over time, or simply allowed to decay.

For the final step, the mold is opened and the formed plastic part or article is removed (or ejected) from the mold cavity. This is shown in Box 160 in FIG. 9. Thereafter, the mold is closed and the process is repeated.

In an alternate process, all or a portion of the gas can be injected into the plastic material after the initial plastic injection (Step 110) and prior to the plastic packing procedure (Step 112). This would allow more of the gas to be introduced into the plastic material in the mold cavity. The shut off valve in the nozzle also could be actuated prior to the gas injection step in order to prevent plastic from being forced back into the injection molding machine. The valve then could be reopened in order to pack additional plastic material into the mold cavity. Thereafter, the shut-off valve could be closed again if the gas injection is restarted.

Movement of the insert members may provide a sufficient pressure drop to obviate the need to shut-off the plastic flow again. Also, a process procedure of backing off the clamping pressure by, for example, opening the mold a few thousands of an inch for a few milliseconds could be utilized. This would allow the plastic material to flow into the void caused by displacement of the insert members and form hollow portions filled with gas in the ribs.

Figure 12:
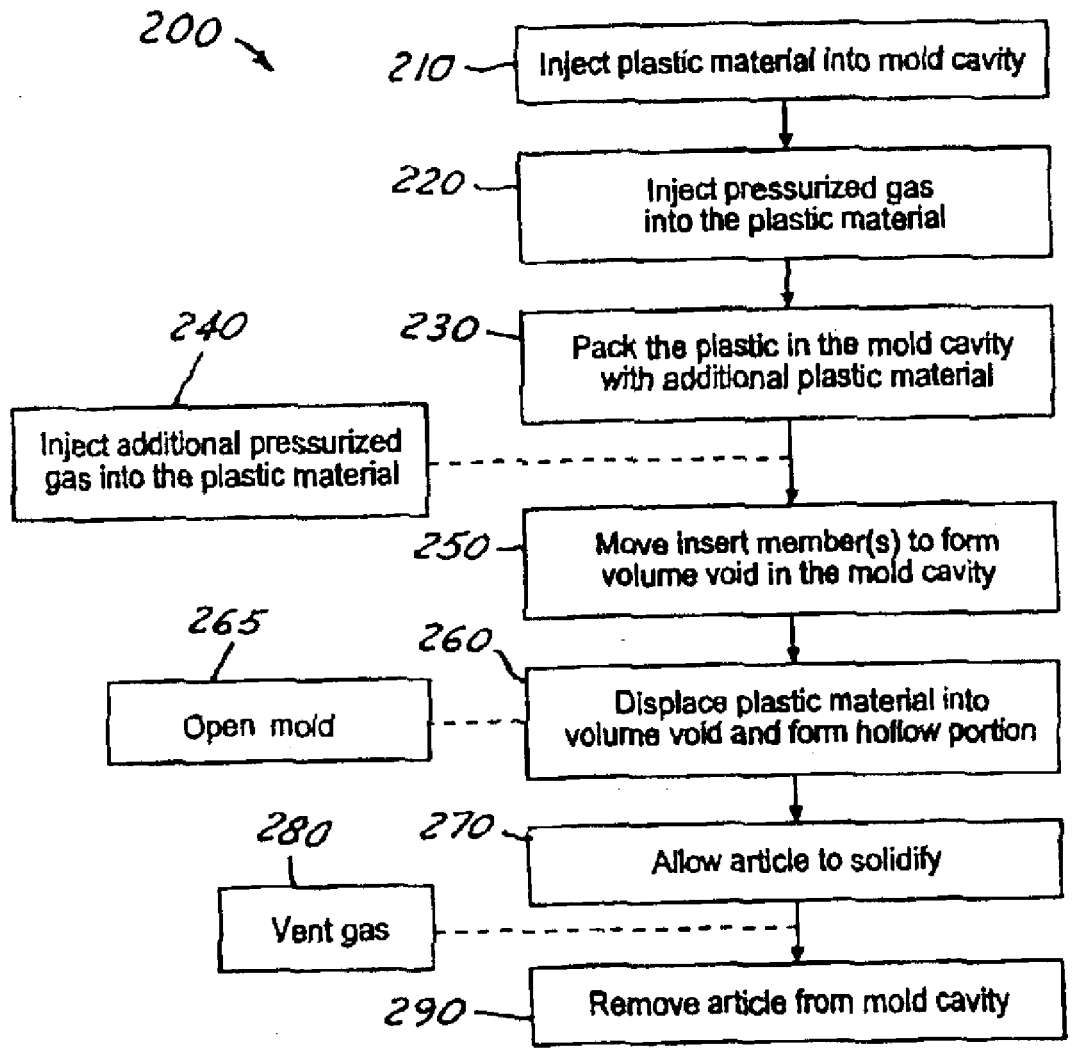
FIG. 12 is a flow diagram of an alternate embodiment of the invention.

A flow diagram schematically illustrating this alternate process is set forth in FIG. 12. The process is designated generally by the reference numeral 200. At Step 210, the plastic material is injected into the mold cavity. Then, in Step 220, all or a portion of the gas is injected into the plastic material in the mold cavity. Thereafter, in Step 230, the plastic material in the mold is packed by the addition of additional plastic material at a higher pressure. This insures that the plastic material entirely fills out the mold cavity and is pressed tightly against all of the surfaces of the mold cavity.

Then, if all of the gas had not been injected earlier, the remaining amount of pressurized gas is injected into the plastic material in the mold cavity. This is shown in Step 240. Also, after the plastic packing Step 230, the shut-off valve in the nozzle is closed in order to prevent plastic material from being pushed back into the barrel of the injection molding machine.

As an alternative, all of the plastic can be injected into the mold cavity before any of the gas is injected. The plastic should completely fill the mold cavity and can be packed if desired. Once the injection of the gas has begun (or is completed), the insert member can be moved.

The injection of the gas should also be continued when the insert member is moved in order to maintain the appropriate gas pressure in the plastic material and keep it pressed tightly against the walls of the mold cavity.

The insert member or members are moved or displaced forming voids in the mold cavity and creating additional volume(s) for the plastic material. This is shown in Step 250. A portion or portions of the still-molten plastic material is displaced or flows into the void volumes, as shown in Step 260. It is also possible at this point to open the mold as described above. This is shown in alternate Step 265. As the plastic material flows or is forced into the void areas, the injected gas forms hollow portions in the plastic material, particularly along the rib members.

Once the plastic article is fully formed, it is allowed to cool and solidify (Step 270). Once the gas is vented (Step 280) or the gas pressure is otherwise relieved in some manner, the mold is opened and the molded plastic article is removed or ejected from the mold cavity (Step 290).

The rib members in which the gas is to be introduced should be designed to prevent the gas from escaping from the rib structure into the nominal wall thickness of the article. Also, the insert members should be dimensioned such that the increase in volume in the mold cavity is proportional to the volume of plastic material which is displaced by the injection of gas into the rib members. Persons skilled in the art have sufficient knowledge to accomplish these tasks.

With the present invention, the mold cavity is increased in available volume at a predetermined point in the plastic injection molding process in order to allow the molten plastic resin from the interior of the rib members to be displaced by the introduction of the gas. The present invention does not require a secondary cavity external to the mold cavity for displacement of the plastic resin material. The insert members compensate for the volumetric variation due to resin viscosity variation inherent in injection molding processes.

Also, with the present invention, volumes of plastic material from a secondary cavity do not have to be recycled or reground. This eliminates an additional processing step which results from other known processes.

Figure 11:
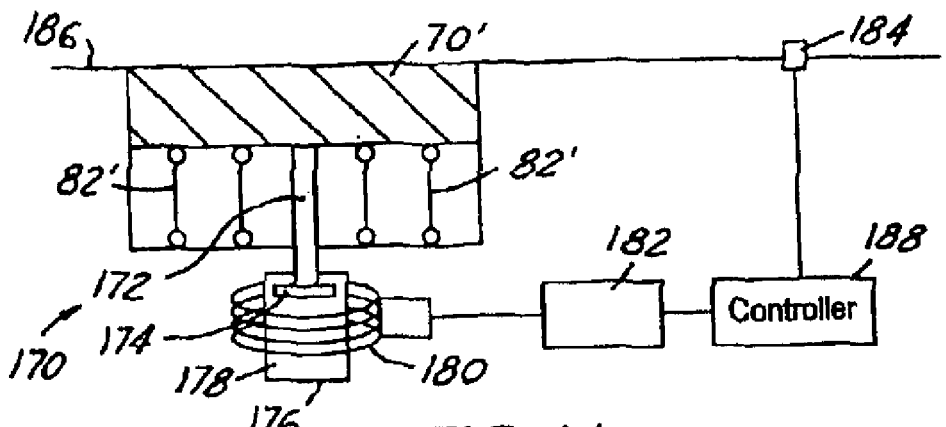
FIG. 11 illustrates an alternate mechanism and system for locking an insert member in place.

An alternate mechanism for locking the insert members in place is shown in FIG. 11 and identified generally by the reference numeral 170. The insert member 70' is biased by spring members 82' and connected by rod member 172 to a piston member 174. The piston member 174 is positioned in a chamber or container 176 which is filled with a controllable fluid 178. Controllable fluids are materials that respond to an applied electric or magnetic field with a change in rheological behavior. Typically, this change is manifested when the fluids are sheared by the development of a yield stress that is more or less proportional to the magnitude of the applied field. These materials are commonly referred to as electrorheological (ER) or magnetorheological (MR) fluids.

Conventional devices that utilize controllable fluids are typically classified as having either fixed poles (valve mode) or relatively moveable poles (direct-shear mode). Valve mode devices can include servo-valves, dampers and shock absorbers, while direct-sheer mode devices can include clutches, brakes, chucking and locking devices. The response time of the fluid damping in these devices can be on the order of 60-milliseconds as the field is changed.

With the embodiment and system shown in FIG. 11, coils 180 are connected to electric current source 182. When the source 182 is activated, the current through coils 180 causes the fluid 178 to harden, thereby preventing the piston member 174 from moving. This, in turn, holds or locks the insert member 70' in place. Activation of the electric current source 182 can be caused in any manner, such as being triggered by a pressure sensor 184 positioned in the mold cavity 186. A control system or mechanism 188, which preferably is a microprocessor, is set or programmed to lock up the insert member when a certain pressure is reached in the mold cavity which would otherwise displace the insert member.

The locking of the insert member could also be triggered by measurement of the movement of the screw ram in the injection molding machine, by certain timing considerations, or any other manner known in the art. For example, a linear transducer could be utilized which measures the axial movement of the screw ram and be connected to a microprocessor system.

Figure 13:
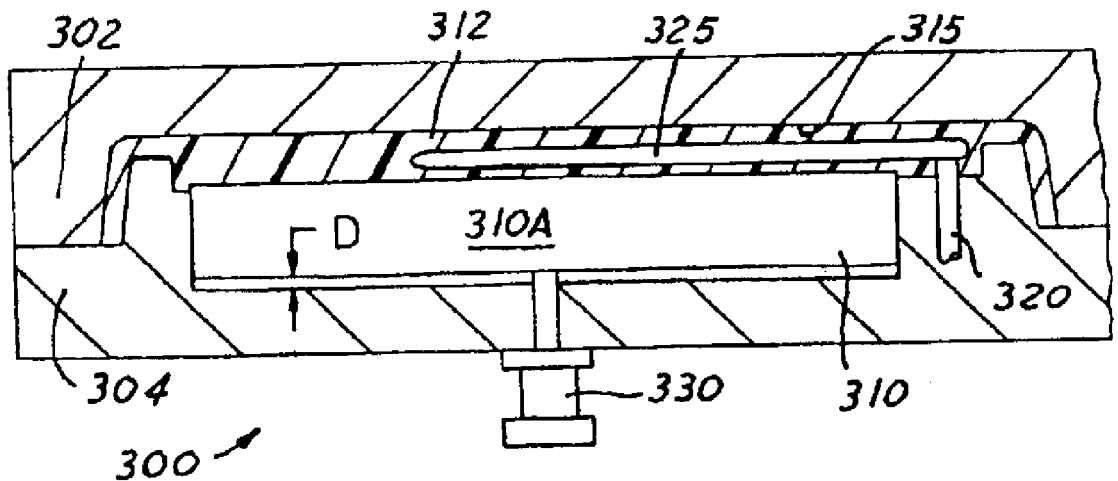
FIGS. 13–14 illustrate a still further embodiment of the invention.
Figure 14:
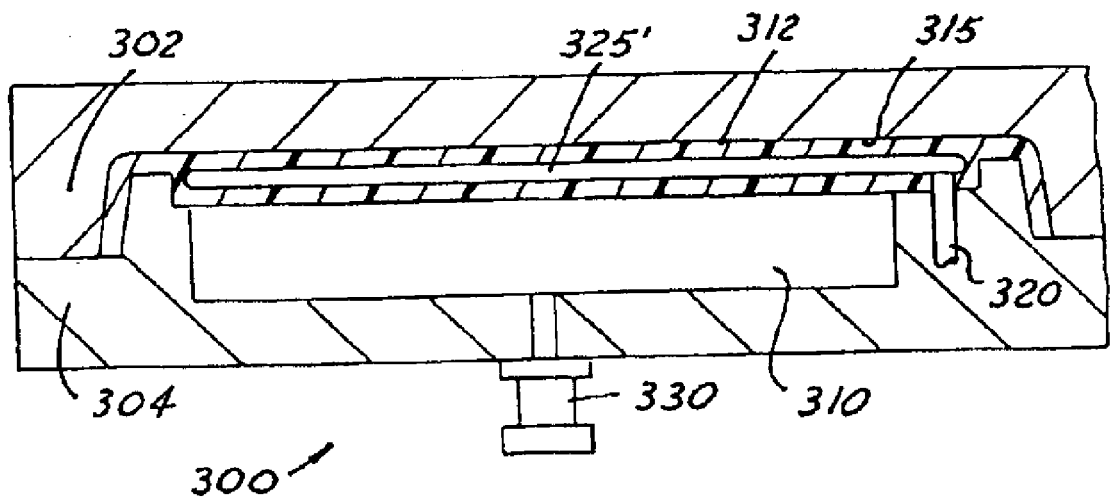

FIGS. 13 and 14 depict still another embodiment of the invention. This embodiment 300 uses a movable insert member which is positioned along a portion of a rib member in the molded part and which does not create a void or vacant area in the cavity when the insert member is moved.

The system 300 includes a mold 302 which has a first member 302 and a second member 304, as well as a moveable insert member 310. The plastic article 312 is formed in a mold cavity 315 positioned between the two mold members 302 and 304.

Once the plastic material is injected into the mold cavity 315, a gas (or other fluid) is injected into the plastic material through pin member 320. The gas initially forms hollow cavity 325 in the plastic part, as shown in FIG. 13.

The insert member 310 is actuated by one or more hydraulic cylinders 330 and moves from an in-mold position 310A in FIG. 13 to a flush-mold position 310B in FIG. 14. The amount of movement "D" of the insert member can be on the order of 0.020 "to 0.030. " Once the plastic material and gas are injected into the mold cavity, the insert member is moved from the position shown in FIG. 13 to the position shown in FIG. 14. This allows the gas to expand in the plastic material and to force the plastic material into the increased volume. This also allows the gas to move to the furthest end of the rib and form the requisite gas channel 325'. This system and process insures that there will not be any blowout of the gas through the plastic material, and also prevents the formation of sink marks on the visible surface of the molded article.

The insert member 310 can be moved from position 310A to 310B simply by the pressure of the injected gas, or it can be moved by actuation of the hydraulic cylinder. Also, the pressure on the hydraulic cylinder can simply be relieved which would then allow the gas pressure to move the plastic and force the insert member to its second position.

Although the present invention has been described above with reference to formation of hollow rib structures and trim components or panels, it is to be understood that the present invention can be used in any gas assist injection molding processes.

While the invention has been described in connection with one or more embodiments, it is to be understood that the specific mechanisms, processes and procedures which have been described are merely illustrative of the principles of the invention, numerous modifications may be made to the methods and apparatus described without departing from the spirit and scope of the invention as defined by the appended claims.

What is claimed is:

1. A method for making an injection molded plastic article with at least one hollow portions said method comprising the steps of:
   providing a mold with an article defining cavity;
   providing a moveable insert member in said article defining cavity;
   locking said moveable insert member against movement;
   subsequently injecting a quantity of a plastic material into the mold cavity, the quantity of plastic material sufficient to completely fill the mold cavity;
   packing said plastic material in said mold cavity;
   injecting a fluid material into said packed plastic material in said mold cavity;
   unlocking said insert member and thereby allowing the pressure from the plastic material and injected fluid material to move said insert member
   allowing plastic material to fill the area formerly occupied by said insert member and thereby creating a hollow portion in said plastic material forming said article;
   allowing the completed plastic article to cool and solidify in the mold cavity,
   exhausting said fluid material from the hollow portion of the plastic article; and
   removing the plastic material from the mold cavity.

2. The method as described in claim 1 wherein said fluid material is a gas.

3. The method as described in claim 1 wherein said plastic article has at least one rib member and said hollow portion is in said rib member.

4. The method as described in claim 1 wherein said quantity of plastic material is injected at a first pressure and said plastic material is packed in said mold cavity at a second pressure greater than said first pressure.

5. The method as described in claim 4 wherein said fluid material is injected into said packed plastic material at a third pressure.

6. The method as described in claim 5 wherein said third pressure is greater than said second pressure.

7. The method as described in claim 1 wherein said insert member is biased in a direction against displacement.

8. The method as described in claim 1 wherein said step of displacing said insert member comprises deactivating an electric current.

9. A method for making an injection molded plastic article having a hollow rib member, said method comprising the steps of:
   injecting a full shot of plastic material into a mold cavity at a first pressure, said mold cavity having a first portion forming said rib member on the completed plastic article and said mold cavity having a displaceable insert member in said first portion;
   packing said plastic material in said mold cavity at a second pressure greater than said first pressure;
   injecting a gas into the plastic material in said first portion and causing displacing of said displaceable insert member; and
   allowing said plastic material to solidify.

10. The method as described in claim 9 further comprising exhausting said gas from said plastic material and removing said completed plastic article from said mold cavity.

11. A method for displacing a displaceable insert member in a mold cavity filled with plastic material, said insert member being biased to its rest position and held in place at its rest position by a moveable piston member, and said piston member being positioned in an electrical activable fluid, said method comprising the steps of:
    deactivating the electrical activable fluid; and
    displacing said insert member by injecting a gas into said plastic material to form a hollow rib member.

12. A system for injection molding a plastic article having a hollow portion therein, the system comprising:
    a mold member having a mold cavity for defining an article, said cavity having at least one insert member positioned therein, and a biasing mechanism to hold said insert member in position during injection of plastic material;
    an injection molding machine for injecting a quantity of molten plastic material into the mold cavity;
    a locking mechanism for selectively preventing movement of said insert member, said locking mechanism comprising a piston member positioned in an electrifiable fluid, said piston member being in operable association with said insert member, and wherein when said fluid is electrified, movement of said piston member and said insert member are prevented;
    a gas introduction mechanism for introducing pressurized gas into at least a portion of the plastic material in the mold cavity;
    wherein the introduction of gas into the plastic material displaces said insert member against the force of said biasing mechanism and allows formation of the complete molded plastic article.

13. The system as described in claim 12 wherein said portion of the plastic material in which gas is introduced comprises at least one elongated rib member.

14. The system as described in claim 13 wherein at least two rib members and at least two insert members are provided, gas is introduced into each of said rib members, and each of said insert members are displaced by plastic material.

15. The system as described in claim 12 wherein said biasing mechanism comprises a spring mechanism.

16. A method for making an injection molded plastic article with at least one hollow portion, said method comprising the steps of:
    injecting a quantity of a plastic material into a mold cavity at a first pressure, the quantity of plastic material sufficient to completely fill the mold cavity;
    packing said plastic material in said mold cavity at a second pressure;
    injecting a fluid material into said packed plastic material in said mold cavity at a third pressure;
    increasing the volume of said mold cavity;
    displacing by said fluid material at least a portion of said plastic material into said increased volume and thereby creating a hollow portion in said plastic material forming said article;
    allowing the completed plastic article to cool and solidify in the mold cavity;
    exhausting said fluid material from the hollow portion of the plastic article; and
    removing the plastic material from the mold cavity.

17. The method as described in claim 16 wherein said fluid material is a gas.

18. The method as described in claims 16 wherein said plastic article has at least one rib member and said hollow portion is in said rib member.

19. The method as described in claim 16 wherein said third pressure is greater than said second pressure.

20. A method for making an injection molded plastic article with at least one hollow portion, said method comprising the steps of:

injecting a quantity of a plastic material into a mold cavity, the quantity of plastic material sufficient to completely fill the mold cavity;

packing said plastic material in said mold cavity;

injecting a fluid material into said packed plastic material in said mold cavity;

displacing an insert member from said mold cavity and thereby increasing the volume of said cavity, said insert member being biased in a direction against displacement and being displaced by pressure from said plastic material or said injected fluid material;

displacing at least a portion of said plastic material into said increased volume and thereby creating a hollow portion in said plastic material forming said article;

allowing the completed plastic article to cool and solidify in the mold cavity;

exhausting said fluid material from the hollow portion of the plastic article; and removing the plastic material from the mold cavity.

21. The method as described in claim 20 wherein said fluid material is a gas.

22. The method as described in claim 20 wherein said plastic article has at least one rib member and said hollow portion is in said rib member.

23. The method as described in claim 20 wherein said quantity of plastic material is injected at a first pressure, said plastic material is packed in said mold cavity at a second pressure greater than said first pressure, and said fluid material is injected into said packed plastic material at a third pressure greater than said second pressure.

24. A method for making an injection molded plastic article with at least one hollow portion, said method comprising the steps of:

injecting a quantity of a plastic material into a mold cavity, the quantity of plastic material sufficient to completely fill the mold cavity;

packing said plastic material in said mold cavity;

injecting a fluid material into said packed plastic material in said mold cavity;

displacing an insert member from said mold cavity and thereby increasing the volume of said mold cavity, said insert member being displaced by deactivation of an electric current;

displacing at least a portion of said plastic material into said increased volume and thereby creating a hollow portion in said plastic material forming said article;

allowing the completed plastic article to cool and solidify in the mold cavity;

exhausting said fluid material from the hollow portion of the plastic article; and removing the plastic material from the mold cavity.

25. The method as described in claim 24 wherein said fluid material is a gas.

26. The method as described in claim 24 wherein said plastic article has at least one rib member and said hollow portion is in said rib member.

27. The method as described in claim 24 wherein said quantity of plastic material is injected at a first pressure, said plastic material is packed in said mold cavity at a second pressure greater than said first pressure, and said fluid material is injected into said packed plastic material at a third pressure greater than said second pressure.

* * * * *